United States Patent
Chen et al.

(10) Patent No.: US 11,537,175 B2
(45) Date of Patent: Dec. 27, 2022

(54) CONNECTION MECHANISM, FOLDABLE DISPLAY DEVICE AND COMMUNICATION DEVICE

(71) Applicant: SHENZHEN EVERWIN PRECISION TECHNOLOGY CO., LTD., Guangdong (CN)

(72) Inventors: Xiaoshuo Chen, Guangdong (CN); Mingsheng Liu, Guangdong (CN); Su Lu, Guangdong (CN); Jianjun Liu, Guangdong (CN); Jin Chen, Guangdong (CN); Changbai Liu, Guangdong (CN)

(73) Assignee: SHENZHEN EVERWIN PRECISION TECHNOLOGY CO., LTD., Guangdong (CN)

( * ) Notice: Subject to any disclaimer, the term of this patent is extended or adjusted under 35 U.S.C. 154(b) by 190 days.

(21) Appl. No.: 17/260,131

(22) PCT Filed: May 7, 2020

(86) PCT No.: PCT/CN2020/088986
§ 371 (c)(1),
(2) Date: Jan. 13, 2021

(87) PCT Pub. No.: WO2020/248746
PCT Pub. Date: Dec. 17, 2020

(65) Prior Publication Data
US 2021/0286413 A1    Sep. 16, 2021

(30) Foreign Application Priority Data
Jun. 14, 2019    (CN) .......................... 201910515201.8

(51) Int. Cl.
*G06F 1/16*    (2006.01)
*F16C 11/04*    (2006.01)

(52) U.S. Cl.
CPC .......... *G06F 1/1681* (2013.01); *F16C 11/045* (2013.01)

(58) Field of Classification Search
CPC .... G06F 1/1615; G06F 1/1616; G06F 1/1675; G06F 1/1681
See application file for complete search history.

(56) References Cited

U.S. PATENT DOCUMENTS

| 2016/0097227 A1* | 4/2016 | Hsu | ...................... | F16M 13/005 |
| | | | | 16/354 |
| 2020/0264673 A1* | 8/2020 | Kim | ...................... | G06F 1/1616 |

(Continued)

FOREIGN PATENT DOCUMENTS

| CN | 107688369 A | 2/2018 |
| CN | 208565248 U | 3/2019 |

(Continued)

OTHER PUBLICATIONS

International Search Report from International Application No. PCT/CN2020/088986 (dated Aug. 5, 2020).

*Primary Examiner* — Anthony Q Edwards
(74) *Attorney, Agent, or Firm* — W&G Law Group

(57) ABSTRACT

A connection mechanism includes fixing seats, rotary seats, and transmission gears. Each of the fixing seats includes base and shaft holes provided at two sides of the arc-shaped base. The rotary seats and the transmission gears are clamped between two adjacent fixing seats. Each of the rotary seats includes a seat body, an arc-shaped groove longitudinally penetrating through the seat body, and a teeth structure formed by laterally extending from a middle portion of the seat body below the arc-shaped groove. Each of the two transmission gears includes a rotation shaft and a gear fixed onto the rotation shaft and engaged with the teeth structure, wherein the rotation shaft passes through the (Continued)

arc-shaped groove and includes two ends respectively limited inside the shaft holes of two adjacent fixing seats.

20 Claims, 12 Drawing Sheets

(56) References Cited

U.S. PATENT DOCUMENTS

| | | | | |
|---|---|---|---|---|
| 2021/0181454 A1* | 6/2021 | Chen | ................... | G02B 7/026 |
| 2021/0286413 A1* | 9/2021 | Chen | ................... | H04M 1/022 |
| 2021/0318723 A1* | 10/2021 | Cheng | ................ | G06F 1/1637 |
| 2021/0355988 A1* | 11/2021 | Cheng | ................ | H04M 1/022 |
| 2021/0373609 A1* | 12/2021 | Kim | ..................... | G06F 1/1681 |
| 2022/0011812 A1* | 1/2022 | Lin | ....................... | G06F 1/203 |

FOREIGN PATENT DOCUMENTS

| | | | |
|---|---|---|---|
| CN | 110145535 | A | 8/2019 |
| CN | 110159651 | A | 8/2019 |
| CN | 110164316 | A | 8/2019 |
| CN | 110176186 | A | 8/2019 |
| CN | 209692828 | U | 11/2019 |
| KR | 20110034189 | A | 4/2011 |

\* cited by examiner

CONNECTION MECHANISM, FOLDABLE DISPLAY DEVICE AND COMMUNICATION DEVICE

CROSS-REFERENCE TO RELATED APPLICATIONS

This patent application is a U.S. national phase of International Application No. PCT/CN2020/088986, filed on May 7, 2020, which claims priority to Chinese Patent Application No. 201910515201.8, filed on Jun. 14, 2019. The disclosures of the aforementioned applications are hereby incorporated by reference in their entireties.

TECHNICAL FIELD

The present disclosure relates to the field of communication electronics, and more particularly, to a connection mechanism, a foldable display device and a communication device.

BACKGROUND

With development of foldable screen technology, foldable-screen mobile phones have become hot technology. Although a foldable screen can be bent, it still cannot be bent by 180 degrees. The bended part is still required to maintain a certain angle R, otherwise the screen will be damaged. The existing folding manners are divided into an inward folding manner and an outward folding manner, that is, the screen is located at an inner side or at an outer side after being folded. For example, Mate X released by Huawei adopts the outward folding manner. However, a problem with the outward folding manner is that the screen is exposed and thus easily scratched by hard objects, while the foldable screen is relatively fragile.

In addition, the existing folding mechanism, which is used to connect two folded screens, has a complicated structure. A small folding mechanism may include hundreds of components assembled together. With such a small volume, controlling by using such a complicated mechanism inevitably leads to increase instability of the folding mechanism, which is also one of the main reasons why the existing foldable screen mobile phones cannot be put into the market in large quantities.

SUMMARY

In view of this, to the present disclosure provides a connection mechanism, an equalization control mechanism, and a foldable display device, in which the connection mechanism and the equalization control mechanism have a simple structure and good stability.

In order to solve the above technical problems, the present disclosure provides a connection mechanism, including: at least three fixing seats longitudinally arranged, two rotary seats, and two transmission gears. Each of the at least three fixing seats includes an arc-shaped base and one or two shaft holes provided at one or two sides of the arc-shaped base. Each of the two rotary seats includes a seat body, an arc-shaped groove longitudinally penetrating through the seat body, and a teeth structure formed by laterally extending from a middle portion of the seat body below the arc-shaped groove. Each of the two transmission gears includes a rotation shaft and a rotary gear fixed to the rotation shaft and engaged with the teeth structure of one of the two rotary seats, wherein the rotation shaft passes through the arc-shaped groove of one of the two rotary seats and includes two ends respectively limited inside the shaft holes of two adjacent fixing seats of the at least three fixing seats. The two rotary seats and the two transmission gears are clamped between two adjacent fixing seats in a misalignment manner. When one of the two rotary seat rotates, the teeth structure of the rotary seat drives one of the transmission gears to rotate, such that the rotation shaft of one of the two transmission gears moves in the arc-shaped groove of the rotary seat to change a position of the rotary seat relative to one of the at least three fixing seats.

The present disclosure further provides an equalization control mechanism that includes a pair of fixing seats respectively located at two outermost sides, a pair of rotary seats, a first clamping seat and a second clamping seat that are located between the pair of rotary seats, and a transmission assembly clamped between the first clamping seat and the second clamping seat. The pair of the rotary seats are respectively located at inner sides of the pair of fixing seats. Each of the pair of rotary seats comprises a seat body, an arc-shaped groove provided in the seat body, and a teeth structure formed by laterally extending from a position below the arc-shaped groove of the seat body. The transmission assembly includes: two first shafts, each of which is limited to a respective one of the first clamping seat and the second clamping seat at two ends; two first gears respectively fixed to the two first shafts; a second shaft passing through the first clamping seat and the arc-shaped groove of a respective one of the pair of rotary seats and being limited to one of the pair of fixing seats and the second clamping seat at two ends; another second shaft passing through the second clamping seat and the arc-shaped groove of the other of the pair of rotary seats and being limited to the other of the pair of fixing seats and the first clamping seat at two ends; and second gears and third gears that are fixed to the respective second shaft and respectively engaged with the respective first gear of the two first gears and the respective teeth structure. The two rotary seats are respectively located at an outside of a diagonal of the first clamping seat and the second clamping seat. When each of the two rotary seats rotates, the teeth structure drives the third gear, and the third gear drives the first gear to be engaged with each other and rotate together through the second shaft, such that the pair of rotary seats rotate synchronously.

The present disclosure further provides a foldable display device that includes a first foldable board and a second foldable board, a back cover, a connection mechanism and an equalization control mechanism that connect the back cover and the first foldable board and the second foldable board, and a foldable screen fixed onto the first foldable board and the second foldable board. The equalization control mechanism equalization includes a pair of fixing seats respectively located at two outermost sides; a pair of rotary seats respectively located at inner sides of the pair of fixing seats, a first clamping seat and a second clamping seat that are located between the pair of rotary seats, and a transmission assembly clamped between the first clamping seat and the second clamping seat. Each of the pair of rotary seats includes a seat body, an arc-shaped groove provided in the seat body, and a teeth structure formed by laterally extending from a position below the arc-shaped groove of the seat body. The transmission assembly includes two first shafts, each of which is limited to a respective one of the first clamping seat and the second clamping seat at two ends; two first gears respectively fixed to the two first shafts; a second shaft passing through the first clamping seat and the arc-shaped groove of a respective one of the pair of rotary seats and being limited to one of the pair of fixing seats and the second clamping seat at two ends; another second shaft passing through the second clamping seat and the arc-shaped groove of the other of the pair of rotary seats and being limited to the other of the pair of fixing seats and the first clamping seat at two ends; and second gears and third gears that are fixed to the respective second shaft and respectively engaged with the respective first gear of the two first gears and the respective teeth structure. The two rotary seats are respectively located at an outside of a diagonal of the first clamping seat and the second clamping seat. Tops of the pair of fixing seats, a top of the first clamping seat and a top of the second clamping seat are fixed to the back cover, and the pair of rotary seats are respectively fixed to the first foldable board and the second foldable board. When the first foldable board and the second foldable board are folded, each of the pair of rotary seats rotates, the teeth structure drives the third gear, and the third gear drives the first gear to be engaged with each other and rotate together through the second shaft, such that the pair of rotary seats rotate synchronously.

The present disclosure further provides a foldable display device that includes a first foldable board and a second foldable board, a back cover, a connection mechanism and an equalization control mechanism for connecting the back cover and the first foldable board and the second foldable board, and a foldable screen fixed onto the first foldable board and the second foldable board. The connection mechanism includes at least three fixing seats longitudinally arranged, two rotary seats, and two transmission gears. Each of the at least three fixing seats includes an arc-shaped base and one or two shaft holes provided at one or two sides of the arc-shaped base. The two rotary seats and the two transmission gears are clamped between two adjacent fixing seats in a misalignment manner. Each of the two rotary seats includes a seat body, an arc-shaped groove longitudinally penetrating through the seat body, and a teeth structure formed by laterally extending from a middle position of the seat boy below the arc-shaped groove. Each of the two transmission gears includes a rotation shaft and a gear fixed onto the rotation shaft and engaged with the teeth structure of one of the two rotary seats, wherein the rotation shaft passes through the arc-shaped groove of one of the two rotary seats and includes two ends respectively limited inside the shaft holes of two adjacent fixing seats of the at least three fixing seats. The two rotary seats are respectively fixedly connected to the first foldable board and the second foldable board, and the at least three fixing seats are fixed to the back cover. When the first foldable board and the second foldable board are folded, each of the two rotary seats is driven to rotate, the teeth structure drives the transmission gear to rotate, such that the rotation shaft of one of the two transmission gears moves in the arc-shaped groove to change a position of the rotary seat relative to one of the at least three fixing seats.

BRIEF DESCRIPTION OF DRAWINGS

The accompanying drawings described herein are used to provide a better comprehension of the present disclosure and constitute a part of the present disclosure. The exemplary embodiments and description of the present disclosure are used to illustrate the present disclosure, and are not intended to constitute an improper limitation of the present disclosure.

DESCRIPTION OF EMBODIMENTS

Figure 1:
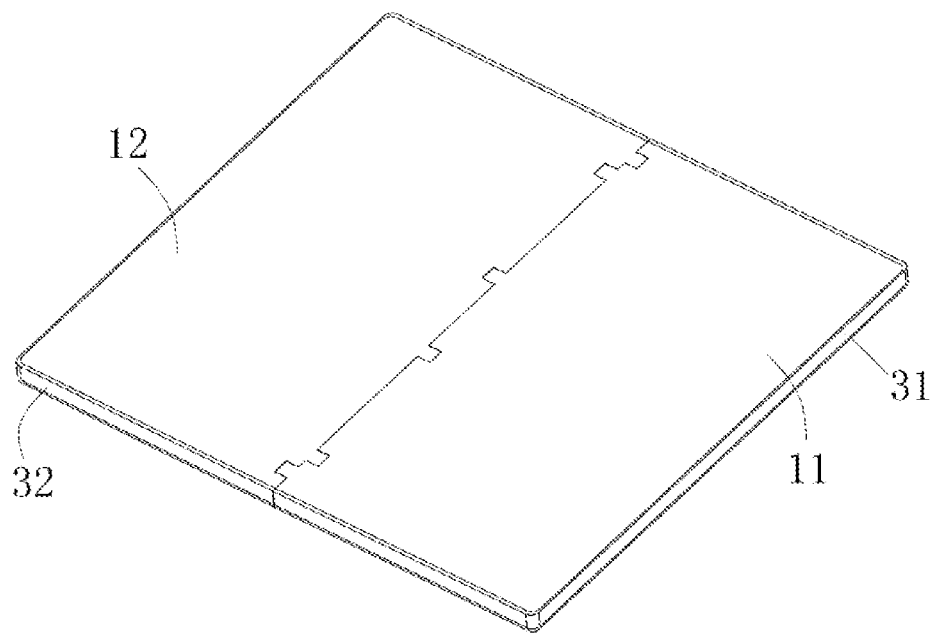
FIG. 1 is a perspective view of a communication device according to the present disclosure.
Figure 2:
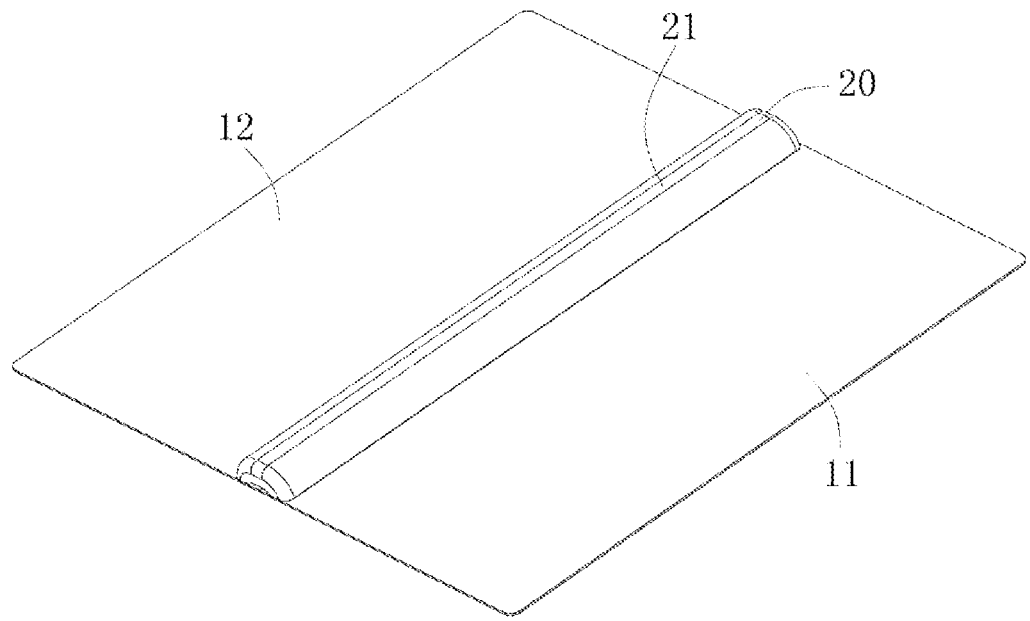
FIG. 2 is a perspective view of a foldable display device according to the present disclosure.
Figure 3:
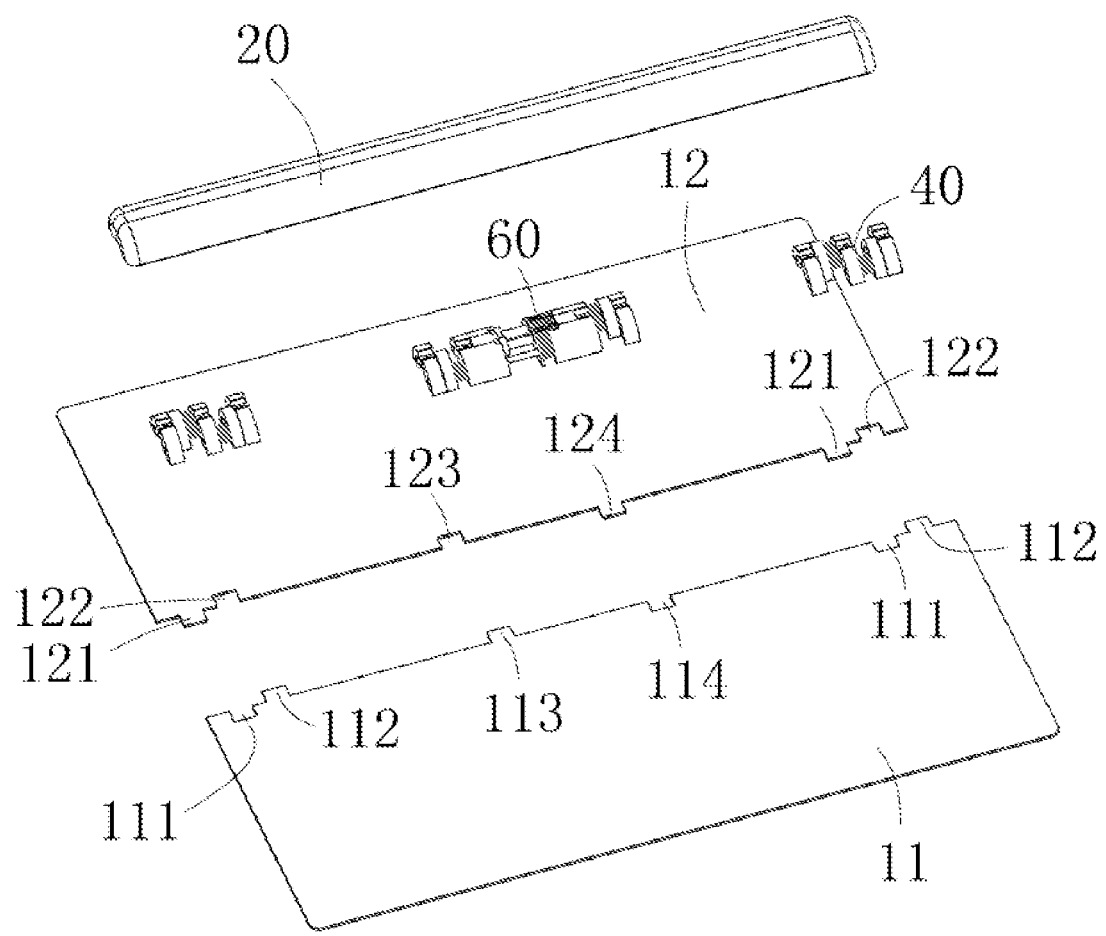
FIG. 3 is a perspective exploded view of a foldable display device according to the present disclosure.
Figure 4:
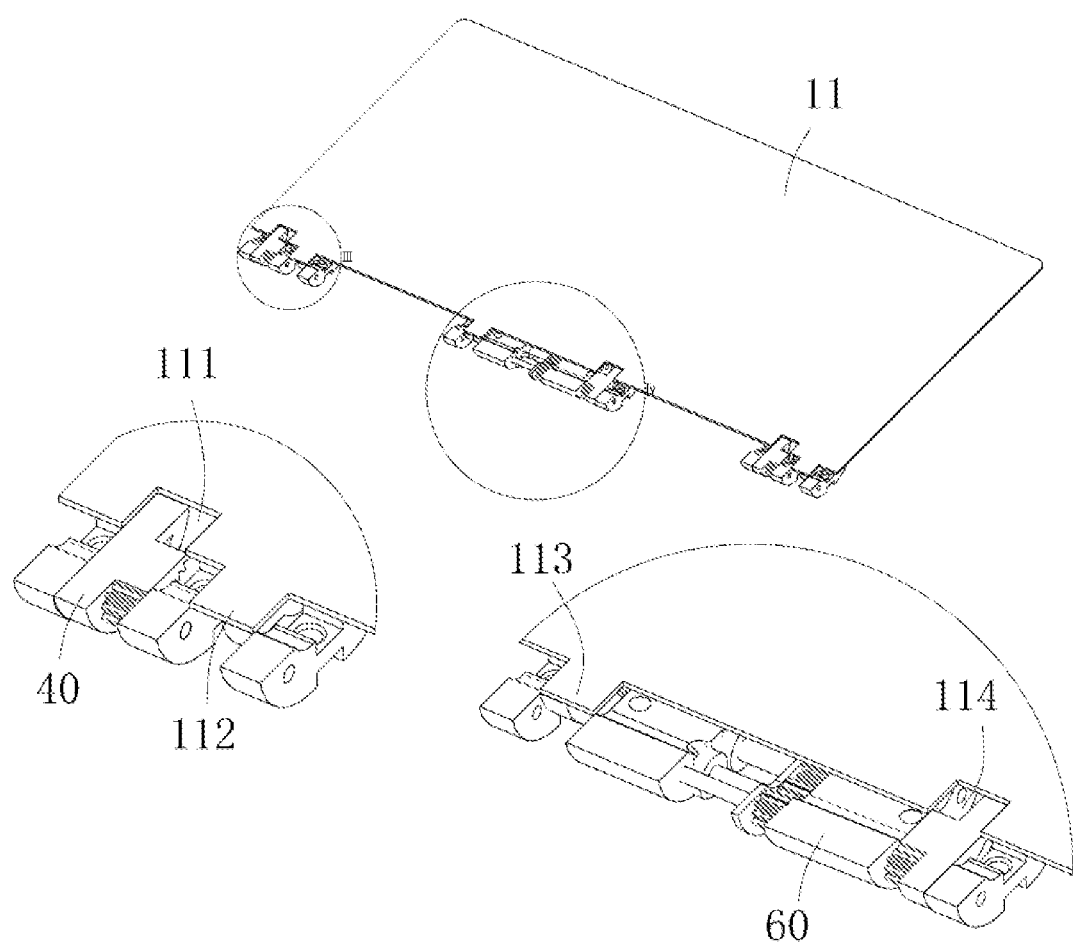
FIG. 4 is a diagram illustrating cooperation of a back cover of a foldable display device with a connection mechanism and an equalization control mechanism according to the present disclosure, and a partially enlarged view thereof.
Figure 5:
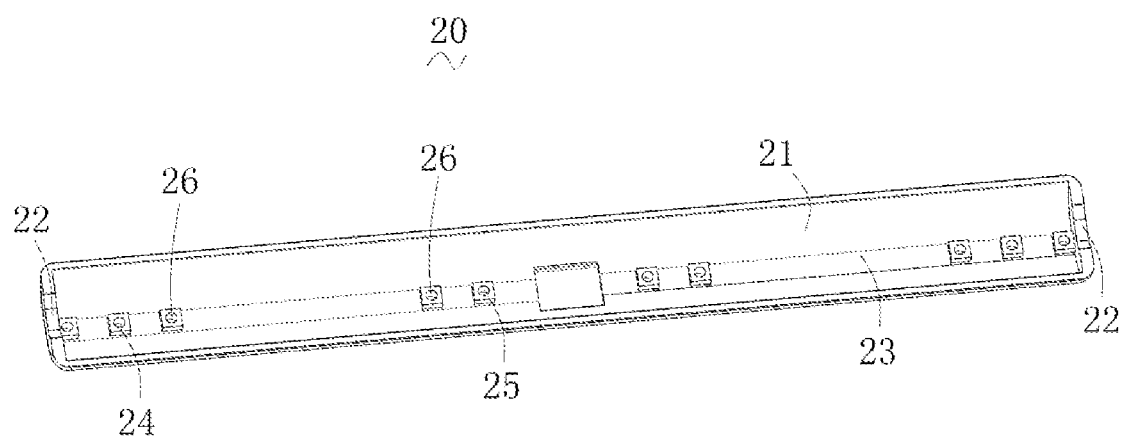
FIG. 5 is a perspective view of a back cover of a foldable display device according to the present disclosure.
Figure 6:
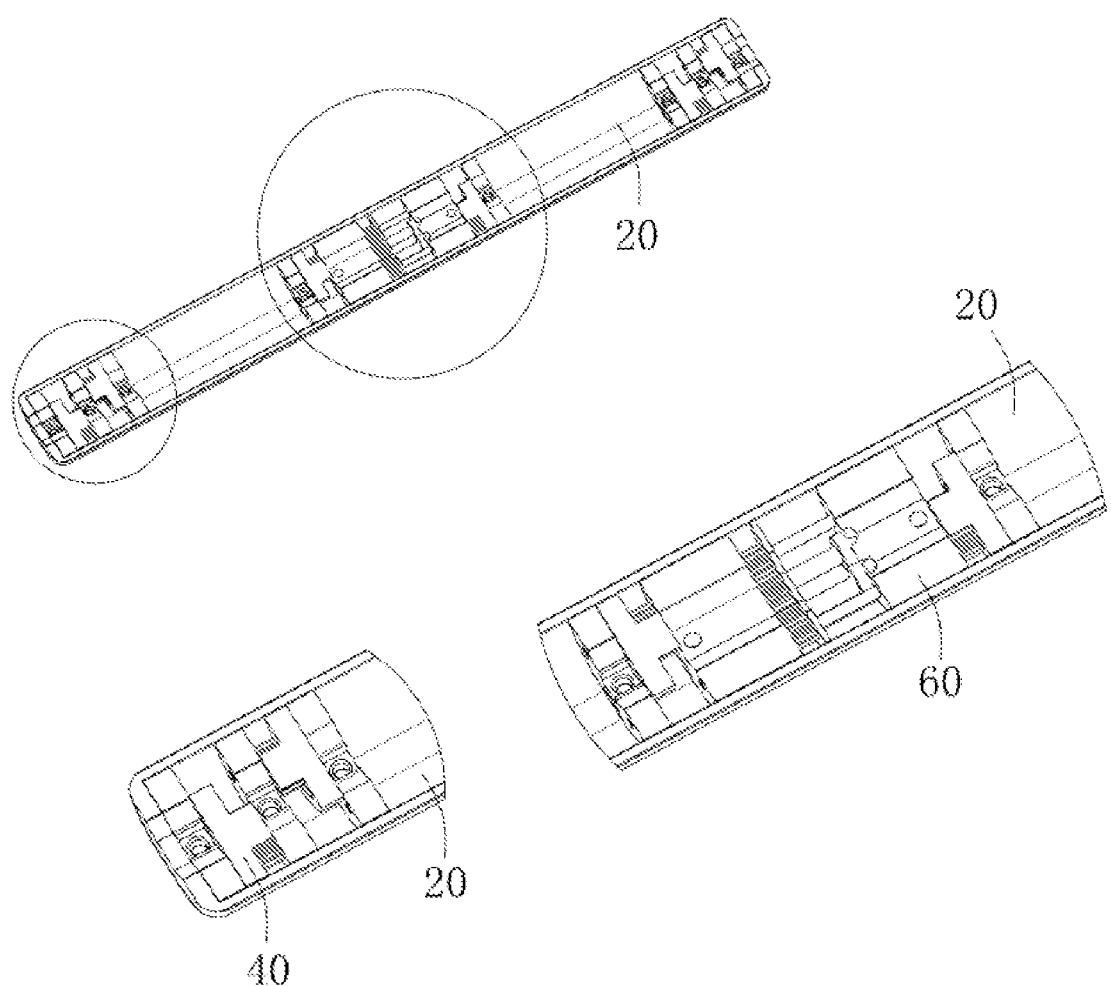
FIG. 6 is a diagram illustrating cooperation of a back cover of a foldable display device with a connection mechanism and an equalization control mechanism according to the present disclosure, and a partially enlarged view thereof.
Figure 7:
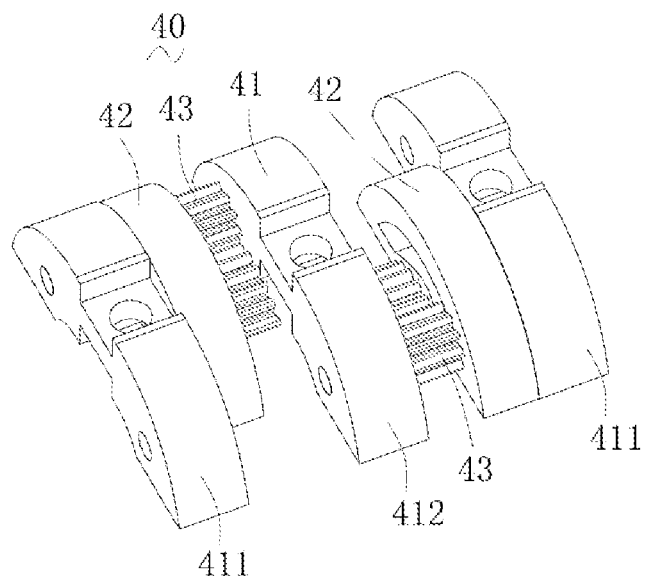
FIG. 7 is a perspective view of a connection mechanism in an unfolded state according to the present disclosure.
Figure 8:
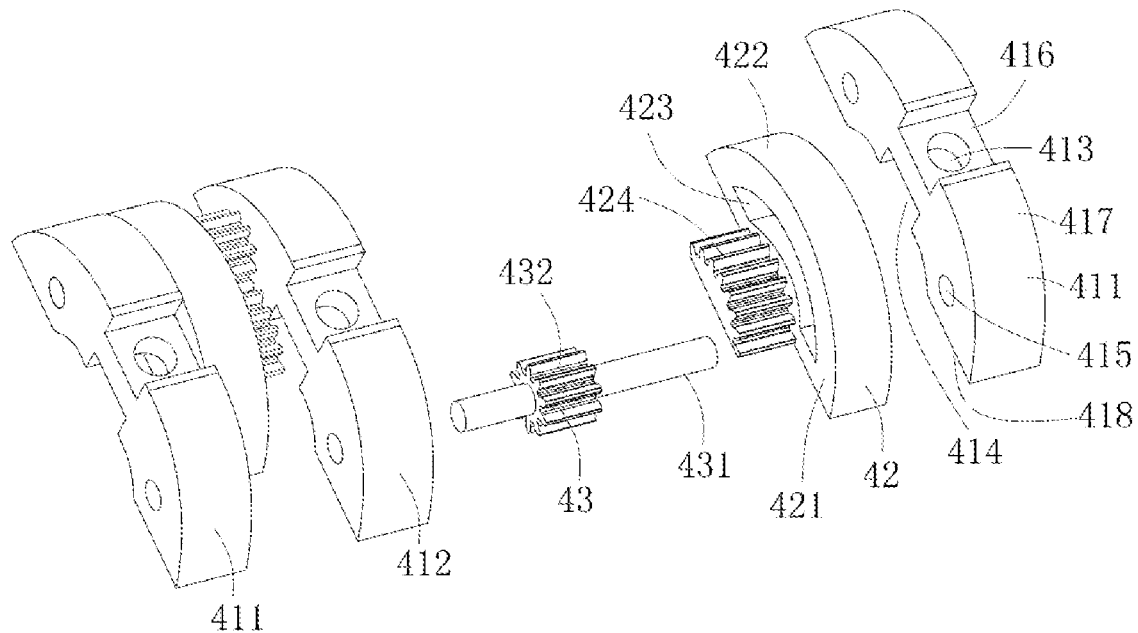
FIG. 8 is a perspective exploded view of a connection mechanism according to the present disclosure.

In order to make the purpose, technical solutions, and advantages of the present disclosure clearer, the technical solutions of the present disclosure will be described hereinafter in detail with reference to specific embodiments and corresponding drawings of the present disclosure. It is apparent that the described embodiments are merely partial embodiments of the present disclosure, rather than all the embodiments. With reference to the embodiments in the present disclosure, all other embodiments obtained by those skilled in the art without involving inventive steps shall fall within the scope of the present disclosure.

With reference to FIG. 1 to FIG. 6, a communication device of the present disclosure includes a first foldable board 11 and a second foldable board 12, a connection mechanism 40, an equalization control mechanism 60, a back cover 20, a first housing 31 and a second housing 32, and a foldable screen (not shown). The connection mechanism 40 connects two opposite sides of the first foldable board 11 and the second foldable board 12. The back cover 20 fixes the connection mechanism 40 and the equalization control mechanism 60. The first housing 31 and the second housing 32 are fixed on outsides of the first foldable board 11 and the second foldable board 12. The foldable screen is attached to inner side surfaces of the first foldable board 11 and second foldable board 12 facing away from the back cover 20.

The first foldable board 11 is provided with a plurality of first notches 111, 114 and a plurality of first protrusions 112, 113 at a side that is located correspondingly to the connection mechanism 40 and the equalization control mechanism 60. The second foldable board 12 is provided with a plurality of second notches 122, 123 and a plurality of second protrusions 121, 124 at a side that is located correspondingly to the connection mechanism 40 and the equalization control mechanism 60. The first protrusions 112, 113 are correspondingly received in the second notches 122, 123, and the second protrusions 121, 124 are correspondingly received in the first notches 122, 123, respectively.

The back cover 20 includes a cover body 21, encasing walls 22 respectively provided at two longitudinal ends of the cover body 21, a back cover cavity 23 formed inside the cover body 21, and a plurality of fixing members 24, 25 provided at a top wall of the back cover cavity 23. The back cover cavity 23 is an arc-shaped cavity, and an outer surface of the cover body 21 is also an arc-shaped outer surface. The fixing members 24, 25 are fixing protrusions protruding from middle of the top wall of the arc-shaped cavity 23 (or a bottom wall of the cavity) towards the back cover cavity 23, and each of the fixing protrusions is provided with a respective fastening hole 26.

The first housing 31 and the second housing 32 are respectively fixed onto the first foldable board 11 and the second foldable board 12. The first housing 31 and the second housing 32 are provided therein with electronic components that are electrically connected to the foldable screen, thereby forming the communication device of the present disclosure, such as a mobile phone.

When the first foldable board 11 and the second foldable board 12 are in an unfolded state, two opposite sides of the first housing 31 and the second housing 32 approach to each other until they are in contact with each other. At this time, the first housing 31 and the second housing 32 hide the back cover 20 therein, thereby achieving a better appearance and eliminating discomfort if the back cover protrudes from the surface. When the first foldable board 11 and the second foldable board 12 are folded, the two opposite sides of the first housing 31 and the second housing 32 are separated from each other until they are spaced by a distance and parallel to each other. At this time, the back cover 20 is exposed outside the first housing 31 and the second housing 32, edges of the opposite sides of the first housing 31 and the second housing 32 are respectively attached to the edges of the cover body 21 of the back cover 20.

The communication device of the present disclosure covers the back cover 20 when the first housing 31 and the second housing 32 are in an unfolded state, such that the back cover 20 is hidden to achieve flatness of a back surface of the communication device, thereby achieving a good appearance and being suitable for being flatly placed on a table to prevent skewing.

With further reference to FIG. 6 to FIG. 11, the connection mechanism 40 of the present disclosure includes at least three fixing seats 41, two rotary seats 42 and a pair of transmission gears 43.

The fixing seats 41 include two outer fixing seats 411 located on the outside and an intermediate fixing seat 412 located between the two outer fixing seats 411. The rotary seats 42 and the transmission gears 43 are divided into two pairs respectively clamped between a respective outer fixing seat 411 and the intermediate fixing seat 412, and are misaligned in a lateral direction.

Each of the fixing seats 41 includes an arc-shaped base 417, a bottom portion 418, a matching fixing portion 416, a clearance portion 414, and a fixing hole 413. The arc-shaped base 417 fits with the back cover cavity 23 of the back cover 20. The bottom portion 418 is located at a bottom side of the arc-shaped base 417 and has a flat structure. The matching fixing portion 416 is provided at an arc-shaped top of the arc-shaped base 417. The clearance portion 414 is located in the middle of the bottom portion 418 and is formed by partially removing a portion of the bottom portion. The fixing hole 413 penetrates through the matching fixing portion 416. The matching fixing portion 416 has a recessed structure, in which the fixing member 24 protruding from the top surface of the back cover cavity 23 of the back cover 20 is received. The matching fixing portion 416 is fastened in the fastening hole 26 of the back cover 20 by a fixing bolt penetrating through the fixing hole 413 from the clearance portion 414. In this way, the fixing seat 41 is fixed onto the back cover 20. Shaft holes 415 are respectively provided at two sides of the arc-shaped base 417 of the fixing seat 41. Each of the outer fixing seats 411 may be provided with one shaft hole 415, and the shaft holes 415 of the two outer fixing seats 411 are located at different sides of the respective outer fixing seats 411 and are misaligned with each other.

Figure 9:
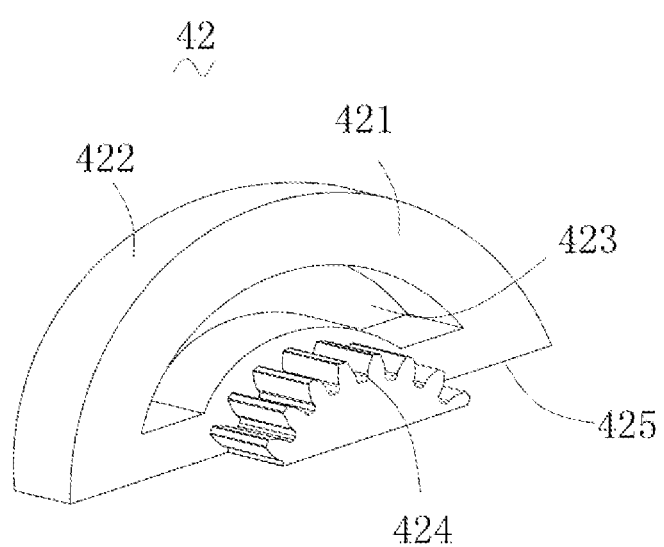
FIG. 9 is a perspective view of a rotary seat of a connection mechanism according to the present disclosure.
Figure 10:
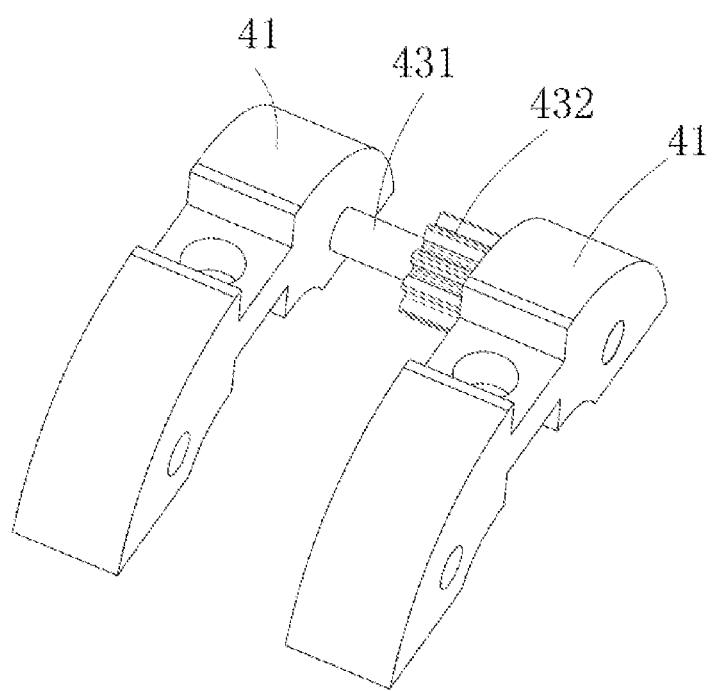
FIG. 10 is a perspective view illustrating cooperation of a base seat with a rotary gear of another base seat.
Figure 11:
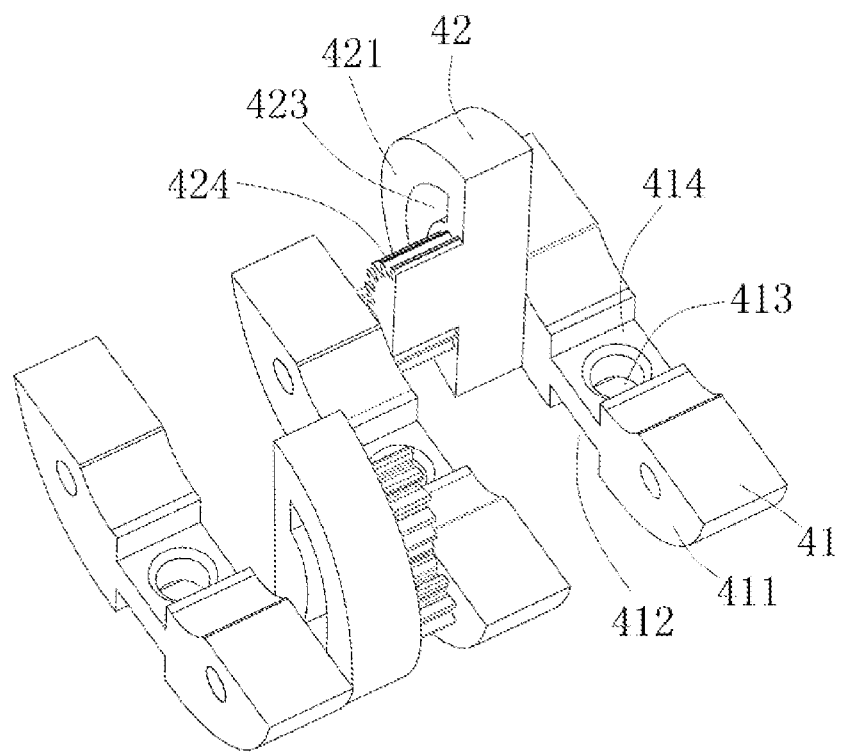
FIG. 11 is a perspective view of a connection mechanism in a folded state according to the present disclosure.
Figure 12:
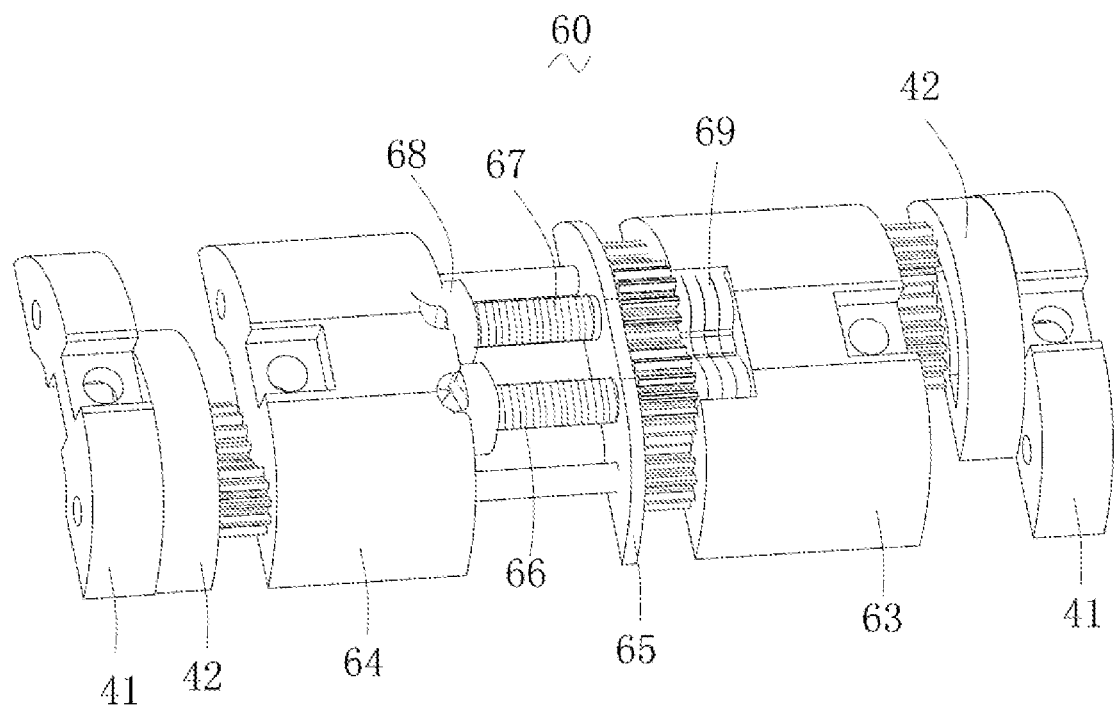
FIG. 12 is a perspective view of an equalization control mechanism in an unfolded state according to the present disclosure.

With reference mainly to FIG. 9, each of the rotary seat 42 includes a seat body 421, an arc-shaped top surface 422 provided at a top surface of the seat body 421, a bottom surface 425 located at a bottom of the seat body 421, an arc-shaped groove 423 formed in the seat body 421, and a teeth structure 424 formed by laterally extending from a middle portion of the seat body 421 below the arc-shaped groove 423. The arc-shaped groove 423 is configured to be concentric with the arc-shaped top surface 422 and the teeth structure 424. The arc-shaped top surface 422 is attached to a partial arc-shaped cavity of the back cover cavity 23 of the back cover 20, such that the rotary seat 42 can rotate around the arc-shaped back cover cavity 23. The arc-shaped top surface 422 of the rotary seat 42 rotates relative to the arc-shaped back cover cavity 23 in conformity with an optimal folding trajectory of the foldable screen.

Each of the transmission gear 43 includes a rotary shaft 431 and a rotary gear 432 fixed onto the rotary shaft 431. A first end of the rotary shaft 431 is limited inside a shaft hole 415 of the intermediate fixing seat 412, and a second end of the rotary shaft 431 passes through the arc-shaped groove 423 of the rotary seat 42 and then is limited inside a shaft hole 415 of one of the outer fixing seats 411. The first ends of the rotary shafts 431 of the two transmission gears 43 are respectively limited inside the shaft holes 415 that are provided at two lateral sides of the intermediate fixing seat 411. Meanwhile, the rotary gear 432 engages with the teeth structure 424 of the rotary seat 42.

Two rotary seats 42 are respectively fixed onto the first foldable board 11 and the second foldable board 12 during assembly. That is, the bottom surface 425 of one of the rotary seats 42 is fixed onto the first foldable board 11, and the bottom surface 425 of the one rotary seat 42 is at least partially fixed to the first protrusions 112 on the first foldable board 11. The bottom surface 425 of the other of the rotary seats 42 is fixed onto the second foldable board 12, and the bottom surface 425 of the other rotary seat 42 is at least partially fixed onto the second protrusions 121 on the second foldable board 12. Moreover, when the first foldable board 11 and the second foldable board 12 are connected and in the unfolded state, the rotary seat 42 installed on the first protrusion 112 of the first foldable board 11 is also located at the respective second notch 122 of the second foldable board 12, and the rotary seat 42 installed on the second protrusion 121 of the second foldable board 12 is also located at the respective first notch 111 of the first foldable board 11.

When the connection mechanism 40 of the present disclosure is operated, the first foldable board 11 and the second foldable board 12 respectively drive the two rotary seats 42 thereon to rotate around the arc-shaped surface of the back cover cavity 23 of the back cover 20. At this time, the teeth structure 424 of the rotary seat 42 drives the rotary gear 432 of the transmission gear 43 to rotate, such that the rotary shaft 431 rotates around the arc-shaped groove 423 of the rotary seat 42 until the teeth structure 424 of the rotary seat 42 rotates from an initial position to an ending position (with reference to FIG. 11). An arc-shaped trajectory of the arc-shaped groove 423 of the rotary seat 42 is consistent with the folding trajectory of the foldable screen, thereby ensuring that a folding path of the foldable screen is an optimal path to avoid damage to the foldable screen.

In the connection mechanism 40 of the present disclosure, one rotary seat 42 and one transmission gear 43 are clamped among the three fixing seats 41 in a misalignment manner, and the teeth structure 424 provided on the rotary seat 42 is engaged with the rotary gear 432 of the transmission gear 43 to rotate. Further, the rotary shaft of the transmission gear 43 is limited inside the arc-shaped groove 423 of the rotary seat 42 to limit a position of the rotary seat 42, and the arc-shaped groove 423 of the rotary seat 42 rotates around the rotary shaft 431 to unfold and fold the first foldable board 11 and second foldable board 12.

With further reference to FIG. 12 to FIG. 19, the equalization control mechanism 60 of the present disclosure includes a pair of fixing seats 41 respectively located at two outermost sides, a pair of rotary seats 42 respectively located at inner sides of the pair of fixing seats 41, a first clamping seat 63 and a second clamping seat 64 located between the pair of rotary seats 42, and a transmission assembly 67 clamped between the first clamping seat 63 and the second clamping seat 64.

Figure 15:
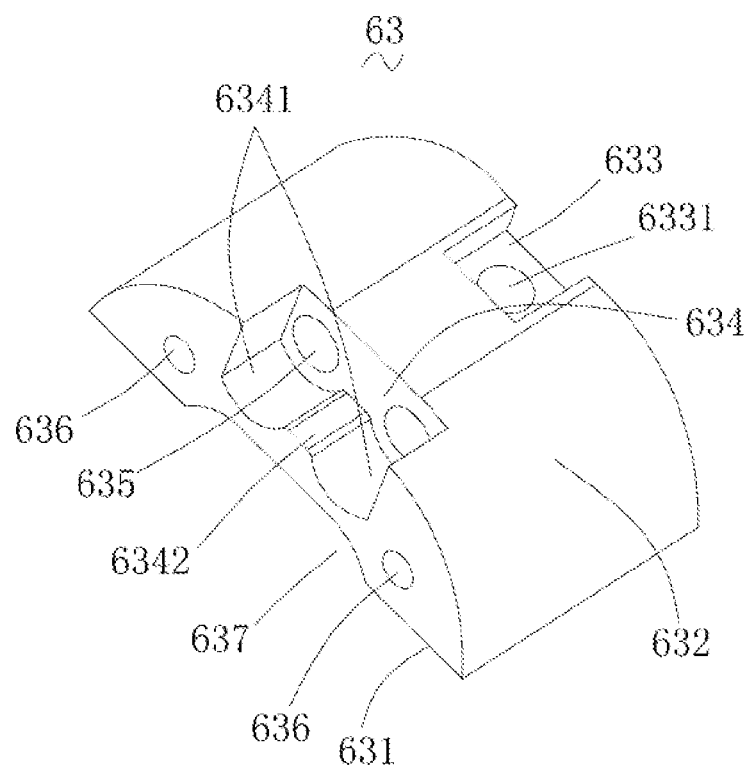
FIG. 15 is a perspective view of a first clamping seat of an equalization control mechanism according to the present disclosure.

As shown in FIG. 15, the structure and operation principle of the fixing seat 41 and the rotary seat 42 of the equalization control mechanism 60 are completely the same as the structure and operation principle of the fixing seat and the rotary seat of the connection mechanism 40, which will not be repeated herein. The first clamping seat 63 includes a first clamping seat body 631, a first arc-shaped top surface 632 formed at the top of the first clamping seat body 631, a pair of first through holes 636 longitudinally penetrating through the first clamping seat body 631, and limiting holes 635 which are disposed between the pair of first through holes 636 and positioned higher than the pair of first through holes 636 in a horizontal direction. A damping recess 634 is formed at a side of the first clamping seat body 631 close to the second clamping seat 64 by being recessed from the first arc-shaped top surface 632, and the damping recess 634 includes a pair of grooves 6341 corresponding to the limiting holes 635 and a protruding portion 6342 located between the pair of grooves 6341. A fixing recess 633 is formed at a side of the first clamping seat body 631 facing away from the second clamping seat 64 by being recessed downward from the first arc-shaped top surface 632, and the fixing recess 633 penetrates through the first clamping seat body 631 in an up-down direction to form a screw hole 6331. A first clearance portion 637 is provided at the middle of the bottom of the first clamping seat body 631.

Figure 16:
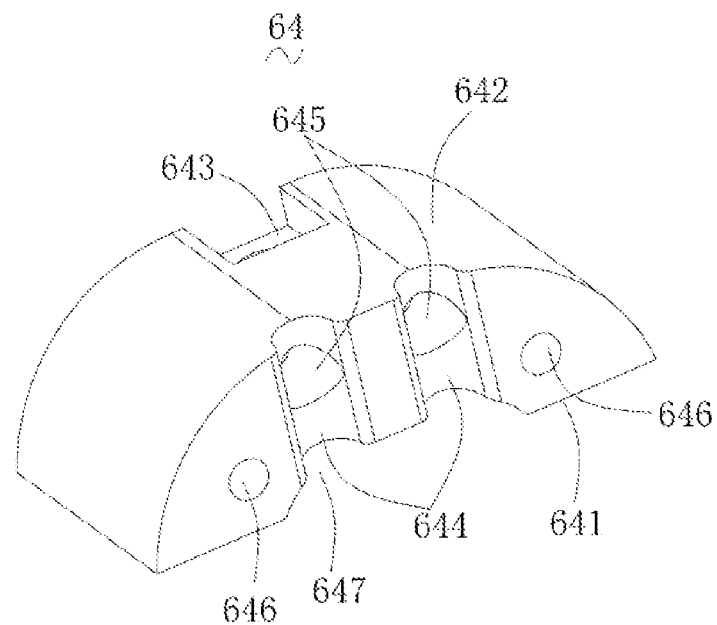
FIG. 16 is a perspective view of a second clamping seat of an equalization control mechanism according to the present disclosure.

With reference to FIG. 16, the second clamping seat 64 includes a second clamping seat body 641, a second arc-shaped top surface 642 formed above the second clamping seat body 641, second through holes 646 longitudinally penetrating through the second clamping seat body 641 and respectively corresponding to the first through holes 636, and limiting holes 645 respectively corresponding to the limiting holes 635. An outer edge of the second clamping seat body 641 close to the first clamping seat 63 recessed toward inside of the second clamping seat body 641 to form a pair of clamping grooves 644, and the pair of clamping grooves 644 respectively correspond to positions of the limiting holes 645. A fixing recess 643 is formed at a side of the second clamping seat body 641 facing away from the first clamping seat 63 by being recessed downward from the second arc-shaped top surface 642, and the fixing recess 643 penetrates through the second clamping seat body 641 in the up-down direction to form a screw hole (not marked by a reference sign). A second clearance portion 647 is provided at the middle of the bottom of the second clamping seat body 641.

The transmission assembly 67 includes a pair of first shafts 671 that are respectively clamped between the limiting holes 635 of the first clamping seat 63 and the limiting holes 645 of the second clamping seat 64, first gears 672 fixed to the first shaft 671, a pair of second shafts 673, second gears 675 fixed to the second shaft 673 and engaged with the first gears 672, and third gears 674 fixed to the second shaft 673 and engaged with the teeth structure 424 of the rotary seat 42. A first end of one of the pair of second shafts 673 is limited in the first through hole 636 of the first clamping seat 63, and a second end of this second shaft 673 is limited in the shaft hole 415 of the fixing seat 41 after passing through the second through hole 646 of the second clamping seat 64 and the arc-shaped grove 423 of the rotary seat 42. The second gear 675 and the third gear 674 are respectively disposed at two ends of the second clamping seat 64. A first end of the other of the pair of second shafts 673 is limited in the second through hole 646 of the second clamping seat 64, and a second end of the other second shaft 673 is limited in the shaft hole 415 of the fixing seat 41 after passing through the first through hole 636 of the first clamping seat 63 and the arc-shaped groove 423 of the rotary seat 42. The second gear 675 and the third gear 674 are respectively disposed at two ends of the second clamping seat 64.

The equalization control mechanism 60 further includes a clamping plate 65, a plurality of damping members 69, concave-convex wheels 68, and springs 66. The clamping plate 65 is sleeved outside the first shafts 671 and the second shafts 673. The plurality of damping members 69 are clamped outside the pair of first shafts 671 and received in the damping recess 634 of the first clamping seat 63. The concave-convex wheels 68 are fixed to outside of the pair of first shafts 671 and respectively fitted with the clamping grooves 644 of the second clamping seat 64. The springs 66 are respectively sleeved outside the first shafts 67 and abut against the clamping plate 65 and the concave-convex wheels 68 at two ends.

Figure 18:
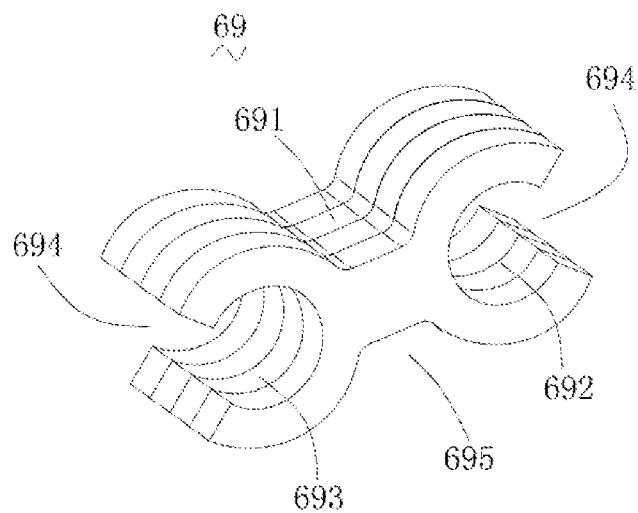
FIG. 18 is a perspective view of a damping member of an equalization control mechanism according to the present disclosure.
Figure 19:
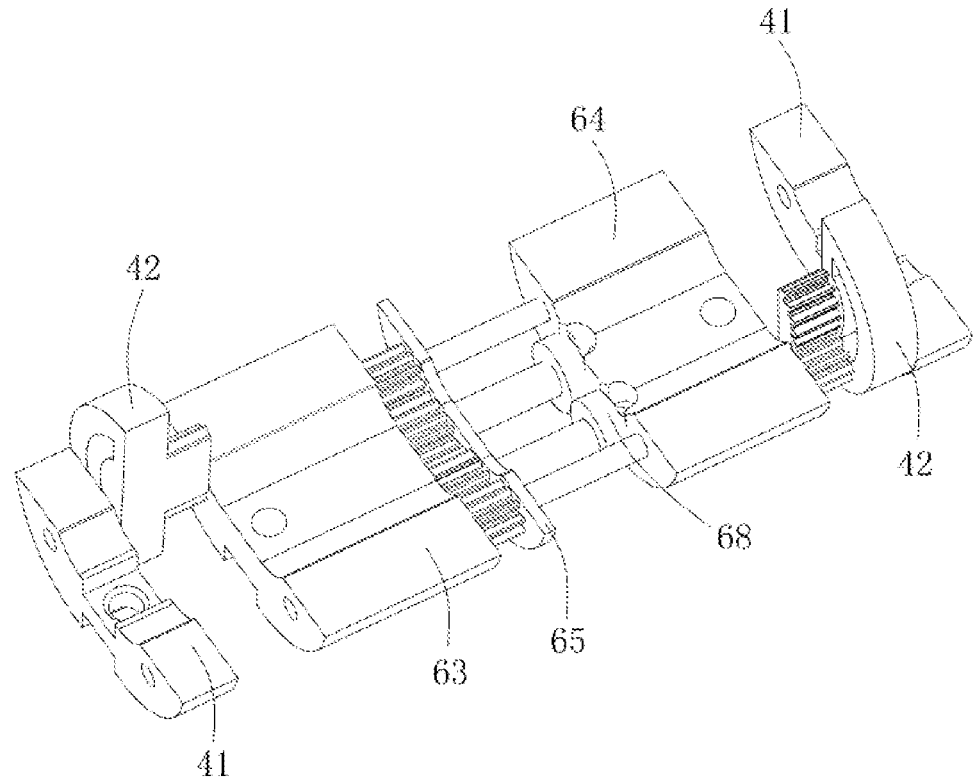
FIG. 19 is a perspective view of an equalization control mechanism in a folded state according to the present disclosure.

With reference to FIG. 18, the damping member 69 includes a connecting portion 691, and a first clamping hole 692 and a second clamping hole 693 respectively formed at two ends of the connecting portion 691. An outer end of the first clamping hole 692 and an outer end of the second clamping hole 693 are each provided with an open end 694, and the connecting portion 691 is disposed on the protruding portion 6342 of the damping recess 634. Each of the first clamping hole 692 and the second clamping hole 693 clamps a respective one of the first shafts 671 and is located in a respective one of the grooves 6341. Each of an inner diameter of each of the first clamping hole 692 and an inner diameter of the second clamping hole 693 is smaller than an outer diameter at a corresponding position of the first shafts 671, so as to apply resistance to the first shafts 671.

Figure 13:
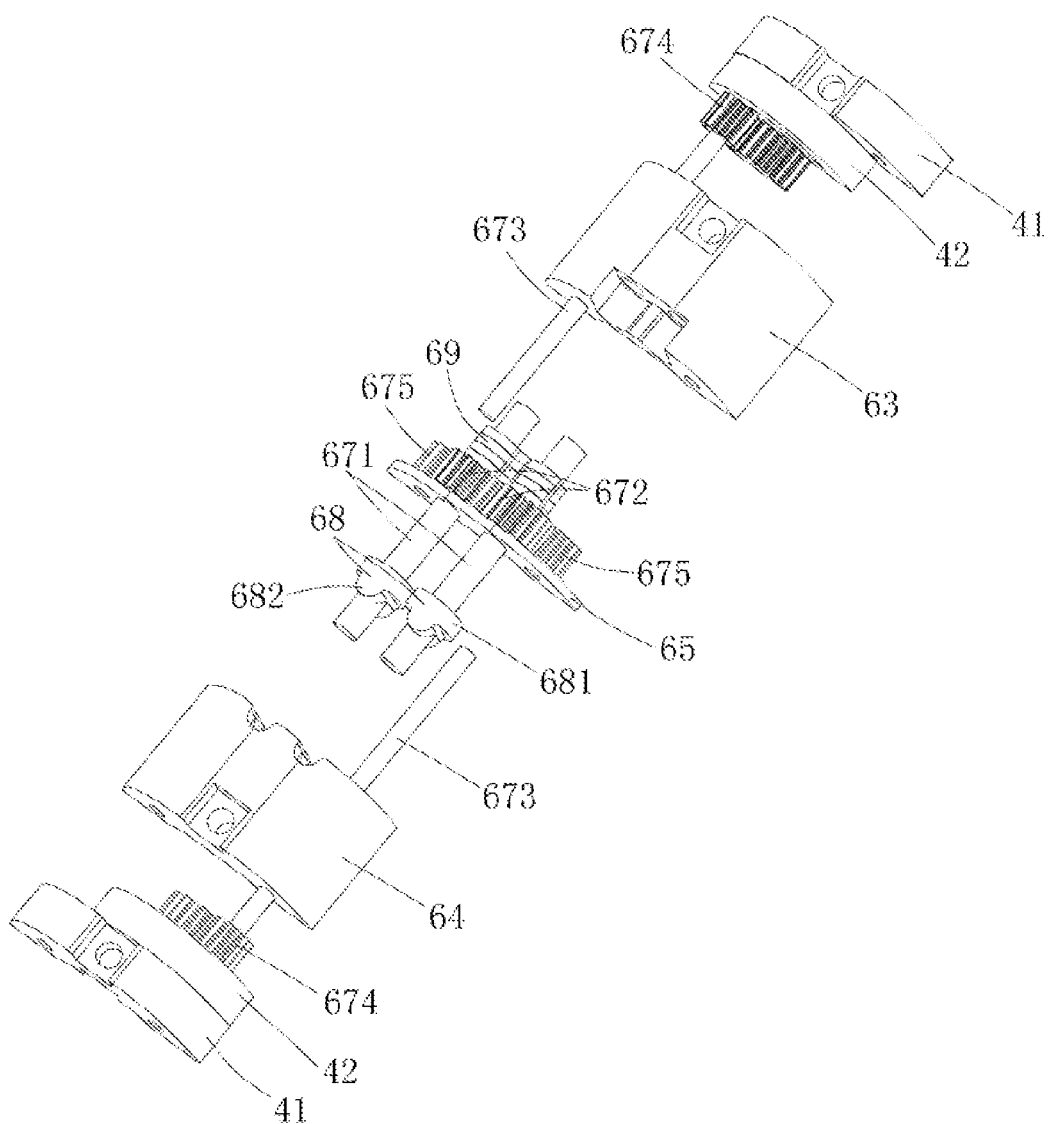
FIG. 13 is a perspective exploded view of an equalization control mechanism according to the present disclosure.
Figure 14:
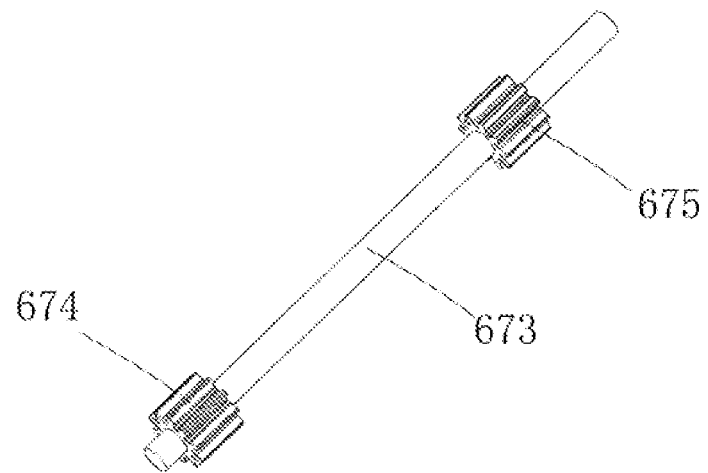
FIG. 14 is a perspective view of a transmission member of an equalization control mechanism according to the present disclosure.

With reference to FIG. 13, the concave-convex wheel 68 includes a ring-shaped body 681 and a pair of clamping blocks 682 extending from the ring-shaped body 681 towards the clamping groove 644. The clamping blocks 682 can be received in the clamping groove 644, and can move out of the clamping groove 644 while rotating and then abuts against a side wall surface of the second clamping seat 64. The spring 66 provides an elastic force to the concave-convex wheel 68.

The fixing seats 41, the first clamping seat 63 and the second clamping seat 64 of the equalization control mechanism 60 of the present disclosure are all fixed to the fixing members 25 of the back cover 20. The bolts pass through the fixing hole 413 and the screw hole 6331 from the clearance portion 414 under the fixing seat 41 and the first and second clearance portions 637, 647 under the first and second clamping seats 63, 64 to be fastened to the fixing members 24, 25. The fixing members 24, 25 are respectively received in the matching fixing portion 416 of the fixing seat 41 and the fixing recesses 633, 643 at the top of the first and second clamping seats 63, 64. The bottom surfaces 425 of the rotary seats 42 are respectively fixed to the first foldable board 11 and the second foldable board 12. One of the rotary seats 42 is fixed to the first protrusion 113 of the first foldable board 11, and the other of the rotary seats 42 is fixed to the second protrusion 124 of the second foldable board 12. Meanwhile, when the equalization control mechanism is unfolded, the first protrusion 113 is received in the second notch 123 of the second foldable board 12, and the second protrusion 124 is received in the first notch 114 of the first foldable board 11.

The operation principle of the equalization control mechanism 60 of the present disclosure is described as follows.

When the first foldable board 11 and the second foldable board 12 rotate, the two rotary seats 42 rotate along with the first and second foldable boards, and the teeth structure 424 of each rotary seat 42 is engaged with the third gear 674 at an end of the second shaft 673 to rotate. In this way, the second gears 675 at another end of the second shaft 673 rotate, and when the second gears 675 rotate, the first gears 672 on the first shafts 671 are driven to rotate. The damping members 69 clamping the first shafts 673 apply resistance to the first shafts 673, such that the first foldable board 11 and the second foldable board 12 can stay at any folding position during the rotating process. The convex-convex wheel 68 operates under an elastic force of the spring 66 in a state that the convex-convex wheel is locked into the clamping groove 644 and in another state that the convex-convex wheel exits from the clamping groove 644, thereby achieving a folding feel. That is, when the clamping blocks 682 of the concave-convex wheel 68 is locked into the clamping groove 644, an obvious hand feel will be generated to indicate a folding completion state.

Figure 17:
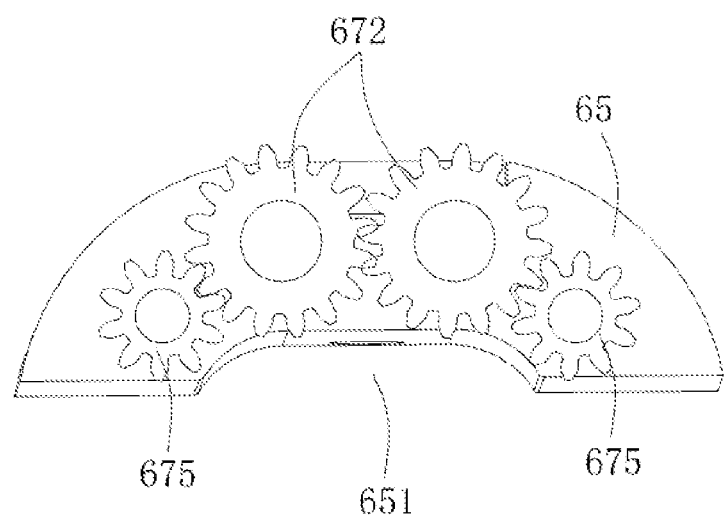
FIG. 17 is a diagram illustrating an engaging and cooperating state of gears of an equalization control mechanism according to the present disclosure.

With reference to FIG. 17, a radius of the second gear 675 is smaller than a radius of the first gear 672. The bottom of the clamping plate 65 is further provided with a clearance space 651, and the first gears 672 and the second gears 675 are arranged along an edge of the clearance space 651. The arrangement of four engaged gears can achieve a same transmission distance while reducing the radius of the gear, that is, a thickness of the equalization control mechanism 60 is reduced.

In the equalization control mechanism 60 of the present disclosure, the pair of first shafts 671 and the pair of second shafts 673 are provided and the pair of first gears 672 and the pair of second gears 675 thereon are engaged to rotate. When the first foldable board 11 or the second foldable board 12 is folded, the first foldable board 11 and the second foldable board 12 must be folded at a same angle through transmission of the first and second gears 672, 675. Meanwhile, the damping members 69 and the convex-convex wheels 68 can provide a better experience for folding angle positioning and folding hand feel.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the scope of the present disclosure.

What is claimed is:

1. A connection mechanism, comprising:
at least three fixing seats longitudinally arranged, each of the at least three fixing seats comprising an arc-shaped base and one or two shaft holes provided at one or two sides of the arc-shaped base;
two rotary seats, each of the two rotary seats comprising a seat body, an arc-shaped groove longitudinally penetrating through the seat body, and a teeth structure formed by laterally extending from a middle portion of the seat body below the arc-shaped groove; and
two transmission gears, each of the two transmission gears comprising a rotation shaft and a rotary gear fixed to the rotation shaft and engaged with the teeth structure of one of the two rotary seats, the rotation shaft passing through the arc-shaped groove of one of the two rotary seats and comprising two ends respectively limited inside the shaft holes of two adjacent fixing seats of the at least three fixing seats,
wherein one of the two rotary seats and an adjacent one of the two transmission gears are clamped between two adjacent fixing seats in a misalignment manner, and
wherein when one of the two rotary seat rotates, the teeth structure of the rotary seat drives one of the transmission gears to rotate, such that the rotation shaft of one of the two transmission gears moves in the arc-shaped groove of the rotary seat to change a position of the rotary seat relative to one of the at least three fixing seats.

2. The connection mechanism according to claim 1, wherein the at least three fixing seats are fixed to a back cover, and the back cover comprises a cover body, a back cover cavity formed inside the cover body, and a plurality of fixing members provided at a top wall of the back cover cavity,
wherein a top of each of the at least three fixing seats and the plurality of fixing members are fastened together,
wherein an outer surface of the arc-shaped base of each of the at least three fixing seats is formed to be an arc surface, and the back cover cavity is formed to be an arc structure that fits with the arc-shaped base, and
wherein a middle portion of the arc-shaped base is recessed to form a matching fixing portion, each of the plurality of fixing members is a protruding structure protruding from the back cover cavity and is received and fastened in the matching fixing portion.

3. The connection mechanism according to claim 2, wherein bottom surfaces of the two rotary seats are respectively fixed to a first foldable board and a second foldable board,
wherein the first foldable board is provided with first protrusions and first notches at a side edge facing towards the second foldable board, and the second foldable board is provided with second notches respectively receiving the first protrusions, and second protrusions respectively received in the first notches at a side edge facing towards the first foldable board.

4. The connection mechanism according to claim 3, wherein the two rotary seats are at least partially fixed to the first protrusions and the second protrusions, respectively, and a top of the seat body of each of the two rotary seats forms an arc-shaped top surface that is attached to the back cover cavity of the back cover,
wherein a sliding trajectory of the rotation shaft of each of the two transmission gears in the arc-shaped groove of a respective one of the two rotary seats in consistent with a folding trajectory of the first foldable board and the second foldable board.

5. The connection mechanism according to claim 1, wherein three of the at least three fixing seats comprise two outer fixing seats located on the outside and an intermediate fixing seat located between the two outer fixing seats,
wherein the intermediate fixing seat is provided with at least two shaft holes at a left side and a right side of the arc-shaped base such that first ends of the two rotation shafts of the two transmission gears are respectively inserted in the at least two shaft holes and positioned, and each of the two outer fixing seats is provided with a shaft hole corresponding to a respective one of the at least two shaft holes of the intermediate fixing seat.

6. An equalization control mechanism, comprising:
a pair of fixing seats respectively located at two outermost sides;
a pair of rotary seats respectively located at inner sides of the pair of fixing seats, each of the pair of rotary seats comprises a seat body, an arc-shaped groove provided in the seat body, and a teeth structure formed by laterally extending from a position below the arc-shaped groove of the seat body;
a first clamping seat and a second clamping seat that are located between the pair of rotary seats; and
a transmission assembly clamped between the first clamping seat and the second clamping seat,
wherein the transmission assembly comprises:
two first shafts, each of which is limited to a respective one of the first clamping seat and the second clamping seat at two ends;
two first gears respectively fixed to the two first shafts;
a second shaft passing through the first clamping seat and the arc-shaped groove of a respective one of the pair of rotary seats and being limited to one of the pair of fixing seats and the second clamping seat at two ends;
another second shaft passing through the second clamping seat and the arc-shaped groove of the other of the pair of rotary seats and being limited to the other of the pair of fixing seats and the first clamping seat at two ends; and
second gears and third gears that are fixed to the respective second shaft and respectively engaged with the respective first gear of the two first gears and the respective teeth structure,
wherein the two rotary seats are respectively located at an outside of a diagonal of the first clamping seat and the second clamping seat, and when each of the two rotary seats rotates, the teeth structure drives the third gear, and the third gear drives the first gear to be engaged with each other and rotate together through the second shaft, such that the pair of rotary seats rotate synchronously.

7. The equalization control mechanism according to claim 6, further comprising:
a clamping plate sleeved on the pair of first shafts; and
springs respectively sleeved on the pair of first shafts and clamped between the clamping plate and the first clamping seat or the second clamping seat, wherein each of the springs is configured to provide an elastic force to prevent the first clamping seat and the second clamping seat from locking the first gear and the second gear.

8. The equalization control mechanism according to claim 7, wherein the pair of fixing seats, the first clamping seat and the second clamping seat are all fixed to a back cover, and the back cover comprises a cover body, a back cover cavity formed inside the cover body, and a plurality of fixing members provided at a top wall of the back cover cavity,
wherein a top of each of the pair of fixing seats, a top of the first clamping seat and a top of the second clamping seat, and tops of the plurality of fixing members are fastened together,
wherein an upper surface of each of the pair of fixing seats, the first clamping seat and the second clamping seat is formed to be an arc surface structure, and the back cover cavity is formed to be an arc-shaped structure that is fitted with the arc surface structures, and
wherein a top middle portion of each of the pair of fixing seats is recessed to form a matching fixing portion, a top portion of each of the first clamping seat and the second clamping seat is recessed to form a fixing recess, each of the plurality of fixing members of the back cover is a protruding structure protruding from the back cover cavity, and each of the plurality of fixing members is received in the respective matching fixing portion and fastened.

9. The equalization control mechanism according to claim 8, wherein each of the pair of fixing seats is provided with a clearance portion at the respective bottom middle positions, and the first clamping seat and the second clamping seat are respectively provided with a first clearance portion and a second clearance portion at the respective bottom middle positions;
wherein the matching fixing portion of each of the pair of fixing seats is provided with a fixing hole that penetrates therethrough to the clearance portion in a vertical direction, and the fixing recess of each of the first clamping seat and the second clamping seat is provided with a screw hole that penetrates therethrough to a respective one of the first clearance portion and the second clearance portion in the vertical direction; and
wherein each of the pair of fixing seats, the first clamping seat and the second clamping seat are fixed to the respective fixing member of the back cover by a bolt passing through the fixing hole and the screw hole from the clearance portion, the first clearance portion and the second clearance portion.

10. The equalization control mechanism according to claim 9, wherein bottom surfaces of the pair of rotary seats are respectively fixed to a first foldable board and a second foldable board, wherein the first foldable board is provided with first protrusions and first notches at a side edge facing towards the second foldable board, and the second foldable board is provided with second notches respectively receiving the first protrusions and second protrusions respectively received in the first notches at a side edge facing towards the first foldable board.

11. The equalization control mechanism according to claim 10, wherein the pair of rotary seats are at least partially fixed to the first protrusions and the second protrusions, respectively, and a top of the seat body of each of the pair of rotary seats forms an arc-shaped top surface that is attached to the back cover cavity of the back cover, wherein a sliding trajectory of the arc-shaped groove of a respective one of the pair of rotary seats is consistent with a folding trajectory of the first foldable board and the second foldable board.

12. The equalization control mechanism according to claim 6, wherein each of the first clamping seat and the second clamping seat is provided with limiting holes at a corresponding position thereof, and the limiting holes are configured to limit two ends of the first shafts;

wherein each of the first clamping seat and the second clamping seat is provided with a through hole for penetrating and limiting of the second shaft at a position corresponding to the second shaft;

wherein each of the pair of fixing seats is provided with a shaft hole at a position corresponding to the through hole; and wherein a horizontal position of an axis of each of the two first gears is higher than a horizontal position of an axis of the second gear, and a radius of each of the two first gears is larger than a radius of the second gear.

13. The equalization control mechanism according to claim 12, wherein a damping recess is formed at a side of the first clamping seat facing towards the two first gears by being recessed from a top portion of the first clamping seat, and damping members configured to clamp the pair of first shafts are installed in the damping recess, wherein an end surface of the second clamping seat facing the first clamping seat is recessed to form clamping grooves, each of which is disposed at a position corresponding to the limiting hole of one of the two first shafts, and wherein for each of the two first shafts, a clamping block that is fitted with the clamping groove is sleeved on the first shaft, the clamping block is clamped in the clamping groove or moved out of the clamping groove in different states, and the spring is clamped between the clamping plate and the clamping block.

14. A foldable display device, comprising:
a first foldable board;
a second foldable board;
a back cover;
a connection mechanism and an equalization control mechanism that connect the back cover and the first foldable board and the second foldable board; and
a foldable screen fixed onto the first foldable board and the second foldable board,
wherein the equalization control mechanism comprises:
a pair of fixing seats respectively located at two outermost sides;

a pair of rotary seats respectively located at inner sides of the pair of fixing seats, each of the pair of rotary seats comprises a seat body, an arc-shaped groove provided in the seat body, and a teeth structure formed by laterally extending from a position below the arc-shaped groove of the seat body;
a first clamping seat and a second clamping seat that are located between the pair of rotary seats; and
a transmission assembly clamped between the first clamping seat and the second clamping seat,
wherein the transmission assembly comprises:
two first shafts, each of which is limited to a respective one of the first clamping seat and the second clamping seat at two ends;
two first gears respectively fixed to the two first shafts;
a second shaft passing through the first clamping seat and the arc-shaped groove of a respective one of the pair of rotary seats and being limited to one of the pair of fixing seats and the second clamping seat at two ends;
another second shaft passing through the second clamping seat and the arc-shaped groove of the other of the pair of rotary seats and being limited to the other of the pair of fixing seats and the first clamping seat at two ends; and
second gears and third gears that are fixed to the respective second shaft and respectively engaged with the respective first gear of the two first gears and the respective teeth structure,
wherein the two rotary seats are respectively located at an outside of a diagonal of the first clamping seat and the second clamping seat;
wherein tops of the pair of fixing seats, a top of the first clamping seat and a top of the second clamping seat are fixed to the back cover, and the pair of rotary seats are respectively fixed to the first foldable board and the second foldable board; and
wherein when the first foldable board and the second foldable board are folded, each of the pair of rotary seats rotates, the teeth structure drives the third gear, and the third gear drives the first gear to be engaged with each other and rotate together through the second shaft, such that the pair of rotary seats rotate synchronously.

15. The foldable display device according to claim 14, further comprising:
a clamping plate sleeved on the pair of first shafts; and
springs respectively sleeved on the pair of first shafts and clamped between the clamping plate and the first clamping seat or the second clamping seat, wherein each of the springs is configured to provide an elastic force to prevent the first clamping seat and the second clamping seat from locking the first gear and the second gear.

16. The foldable display device according to claim 15, wherein the back cover comprises a cover body, a back cover cavity formed inside the cover body, and a plurality of fixing members provided at a top wall of the back cover cavity;
wherein the top of each of the pair of fixing seats, the top of the first clamping seat, the top of the second clamping seat, and a top of each of the plurality of fixing members are fastened together;
wherein an upper surface of each of the pair of fixing seats, the first clamping seat and the second clamping seat is formed to be an arc surface structure, and the back cover cavity is formed to be an arc-shaped structure that is fitted with the arc surface structures; and wherein a top middle portion of each of the pair of fixing seats is recessed to form a matching fixing portion, a top portion of each of the first clamping seat and the second clamping seat is recessed to form a fixing recess, each of the plurality of fixing members of the back cover is a protruding structure protruding from the back cover cavity, and each of the plurality of fixing members is received in the respective matching fixing portion and fastened.

17. The foldable display device according to claim 16, wherein each of the pair of fixing seats is provided with a clearance portion at the respective bottom middle positions, and the first clamping seat and the second clamping seat are respectively provided with a first clearance portion and a second clearance portion at the respective bottom middle positions;

wherein the matching fixing portion of each of the pair of fixing seats is provided with a fixing hole that penetrates therethrough to the clearance portion in a vertical direction, and the fixing recess of each of the first clamping seat and the second clamping seat is provided with a screw hole that penetrates therethrough to a respective one of the first clearance portion and the second clearance portion in the vertical direction; and wherein each of the pair of the fixing seats, the first clamping seat and the second clamping seat are fixed to the respective fixing member of the back cover by a bolt passing through the fixing hole and the screw hole from the clearance portion, the first clearance portion and the second clearance portion.

18. The foldable display device according to claim 15, wherein each of the first clamping seat and the second clamping seat is provided with limiting holes at corresponding positions thereof, and the limiting holes are configured to limit two ends of the first shafts;

wherein each of the first clamping seat and the second clamping seat is provided with a through hole for penetrating and limiting of the second shaft at a position corresponding to the second shaft;

wherein each of the pair of fixing seats is provided with a shaft hole at a position corresponding to the through hole; and wherein a horizontal position of an axis of each of the two first gears is higher than a horizontal position of an axis of the second gear, and a radius of each of the two first gears is larger than a radius of the second gear.

19. The foldable display device according to claim 18, wherein a damping recess is formed at a side of the first clamping seat facing the two first gears by being recessed from a top portion of the first clamping seat, and damping members configured to clamp the pair of first shafts are installed in the damping recess, wherein an end surface of the second clamping seat facing towards the first clamping seat is recessed to form a clamping groove at a position corresponding to the limiting hole of the first shaft, and clamping blocks each of which is disposed at a position corresponding to the limiting hole of a respective one of the two first shafts, and wherein for each of the two first shafts, a clamping block that is fitted with the clamping groove is sleeved on the first shaft, the clamping block is clamped in the clamping groove or moved out of the clamping groove in different states, and the spring is clamped between the clamping plate and the clamping block.

20. The foldable display device according to claim 14, wherein the first foldable board is provided with first protrusions and first notches at a side edge facing towards the second foldable board, and the second foldable board is provided with second notches respectively receiving the first protrusions and second protrusions respectively received in the first notches at a side edge facing towards the first foldable board, wherein the pair of rotary seats are at least partially fixed to the first protrusion and the second protrusion, respectively, and a top of the seat body of each of the pair of rotary seats forms an arc-shaped top surface that is attached to the back cover cavity of the back cover.

\* \* \* \* \*